(12) United States Patent
Ashe

(10) Patent No.: US 6,754,596 B2
(45) Date of Patent: Jun. 22, 2004

(54) METHOD OF MEASURING POSITION AND ORIENTATION WITH IMPROVED SIGNAL TO NOISE RATIO

(75) Inventor: Westley Ashe, Milton, VT (US)

(73) Assignee: Ascension Technology Corporation

(*) Notice: Subject to any disclaimer, the term of this patent is extended or adjusted under 35 U.S.C. 154(b) by 0 days.

(21) Appl. No.: 10/284,657

(22) Filed: Nov. 1, 2002

(65) Prior Publication Data

US 2004/0088136 A1 May 6, 2004

(51) Int. Cl.[7] .............................................. G06F 15/00
(52) U.S. Cl. ....................................................... 702/56
(58) Field of Search ................... 702/56, 150; 455/330, 455/23, 84; 342/367; 356/450, 497; 347/10; 204/164; 714/734; 194/318; 123/406; 716/25; 703/14; 655/313; 370/464; 364/488

(56) References Cited

U.S. PATENT DOCUMENTS 5,768,145 A * 6/1998 Roethig ........................ 703/14
5,835,380 A * 11/1998 Roethig ......................... 716/2
2002/0034191 A1 * 3/2002 Shattil ......................... 370/464

* cited by examiner

Primary Examiner—John Barlow
Assistant Examiner—Tung S Lau
(74) Attorney, Agent, or Firm—H. Jay Spiegel

(57) ABSTRACT

A method of measuring position and orientation of an object in a space in six-degrees of freedom includes a three axis transmitter transmitting a magnetic field to be received by a three axis receiver. The transmitter transmits a pulsed DC transmit waveform. The waveform is preferably a symmetrical square wave with distinct non-overlapping axes and signal processing is accomplished such that the integrator is reset at the start of the rising edge transient period, the coil output signal is integrated throughout the rising edge transient and steady state periods, and the integration result is measured at the end of the steady state period, for each axis. The result is dramatically enhanced signal to noise ratio. The timing of measurements is chosen to reduce eddy current distortion while providing improved compensation for drift of the sensor with respect to the Earth's stationary magnetic field.

19 Claims, 5 Drawing Sheets

METHOD OF MEASURING POSITION AND ORIENTATION WITH IMPROVED SIGNAL TO NOISE RATIO

BACKGROUND OF THE INVENTION

The present invention relates to a method of measuring position and orientation with improved signal to noise ratio. The present invention contemplates transmitting a three axis pulsed DC transmit waveform that is received by a three axis receiver. This general concept is well known. However, in systems employing such structure, typically, only the leading edge of the waveform is used in conducting measurements. Typically, the signal to noise ratio is relatively low since only a portion of the signal energy is used.

The concept of using transmitting and receiving components incorporating electromagnetic coupling is well known in the field of bio-mechanics and in minimally invasive surgery. As one example, sensors transmit position information regarding the locations of surgical instruments within the body. This information is employed by a computer and display to precisely show relative motions of instruments so monitored, giving the surgeon valuable information regarding required actions.

Magnetic position and orientation measuring systems are also used in the field of motion capture and digitization in which an actor moves in such a manner as to animate a virtual character. When conductive materials are present adjacent the location where the actor is moving, they generate eddy current fields which distort the received magnetic field signals, thereby causing undesirable errors in the computed sensor position. Systems employing pulsed DC transmit waveforms and various magnetic sensor and signal processing techniques have been developed in an attempt to reduce these negative effects. Sensors employed in these applications measure both the H field and the derivative dH/dT field. The H field is generally measured by a flux gate magnetometer, Hall effect sensor, magneto-optical sensor or magneto-resistive sensor. Calculation of the dH/dT field is typically performed through the use of a coil in series with an integrator.

The following prior art is known to Applicant:

Volume 41, *Geophysics*, April, 1976, pages 287–299, describe the advantages and disadvantages of DC field (H) measurement systems using a flux gate magnetometer sensor means and measurement of dH/dT using a coil-integrator sensing means when employed in a pulse excited geomagnetic prospecting system. This publication fails to teach or suggest determination of the position of a sensor relative to a transmitter in three dimensions.

U.S. Pat. Nos. 4,849,692 and 4,945,305, both to Blood, disclose a position measuring system in which a pulsed DC waveform is transmitted and the transmitted signal plus eddy field distortion are sensed using a DC responsive sensor. The transmitted waveform is held in a steady state until the eddy current fields decay to a nominal value, at which time the remaining sensed field value is digitized and processed. The systems disclosed in the Blood patents require compensation for the presence of the Earth's magnetic field, which field is generally an order of magnitude larger than the sensed signal from the transmitter. This requirement adds cost and size to the signal processing system and the requirement to wait until the eddy current field distortion has decayed adds unacceptable additional processing time.

U.S. Pat. No. 4,868,498 to Lusinchi discloses an angular measurement device including a magnetic transmitter element affixed to a rotating body. A transmitted signal is sensed by a coil, the output of which is then integrated to provide a flux reading from the transmitter. The system disclosed by Lusinchi may measure the angular position of a rotating body but is not capable of determining position in three dimensions.

U.S. Pat. No. 5,272,658 to Eulenberg discloses a long-term integrator for integrating a voltage signal from a coil measuring magnetic induction. Eulenberg also discloses the use of a flux measuring coil followed by an offset reducing amplifier followed by a digital integrator consisting of an analog-to-digital converter and a DSP, the sum of which comprises a long-term flux meter. The system disclosed by Eulenberg does not include description of a method or apparatus for determining position from the coil-integrator magnetic field measurement system and only claims the long-term integrator portion of the disclosure.

U.S. Pat. No. 5,453,686 to Anderson discloses a position measuring system using the same type of transmit waveform and position algorithm as disclosed in U.S. Pat. No. 4,849,692 to Blood but with the addition of a coil-integrator sensor means similar to that which is disclosed in the Eulenberg patent. The coil-integrator sensing means which is comparable to a well known flux gate magnetometer is well known in the art to produce results equivalent to a flux gate magnetometer when measuring transient magnetic events. The transmitting waveform disclosed in U.S. Pat. No. 4,849,692 to Blood is precisely the same as that which is used in the Anderson patent. The transmitting waveform disclosed in Blood '692 and Anderson utilizes only half of the available transmit energy when the coil integrator is employed as the sensing element. While Anderson does not require compensation for the static portion of the Earth's magnetic field, when the sensor coils are rotated in the Earth's magnetic field, an undesired electromagnetic field is generated at the coil terminals and integrated. As a result, sensor offset errors occur due to dynamic sensor motion in a static magnetic field. The present invention contemplates reducing this type of error.

U.S. Pat. No. 5,767,669 to Hansen et al. discloses a system in which a triangular non-steady state transmit waveform is employed to overcome eddy current distortions that would otherwise be created by adjacent conductive metals. In one embodiment of the Hansen et al. patent, a transmit waveform is produced in such a manner that eddy current conditions in the conductive metal environment reach a steady state condition during both the rising and falling edges of the transmit waveform. The Hansen et al. patent also discloses numerous techniques for reducing the duration of either the rising and/or falling edges of the transmit waveform to increase the measurement rate. In all disclosed versions, the system requires that the integration reset and output digitization occur during transient conditions of the transmitted waveform, thereby requiring a high bandwidth signal chain. This mode of operation also requires extremely precise time synchronization between the transmitter and sensor signal processing. In motion capture applications, it is highly desirable to facilitate operation devoid of physical connections between the transmitter and signal processor so that the person who is performing the choreographed movements is unencumbered by attached cabling. Often, precision in measurements can be lost when attempting to synchronize when using a wireless configuration. The concept of time jitter is often encountered. Such time jitter results in reduction in synchronization precision which produces noise, offsets and other undesirable effects on system output. The present invention contemplates reducing these undesirable effects.

In the prior art, pulsed DC transmit waveforms are produced such that the falling edges of the X and Y axes overlap with the rising edges of the Y and Z axes, respectively, such that resetting the integration before the transient condition and integrating the coil output during the transient period produce a value that does not represent a useful quantity. Additionally, prior art systems require that the integrator be reset at the beginning of an X, Y, Z, OFF cycle and then read at the end of that cycle. The difference between the two values consists of the inherent drift of the integrator plus any output contribution due to motion in a static magnetic field. This difference is then divided proportionally according to time and subtracted from the measured values of X, Y and Z sensed fields. By contrast, in the preferred embodiment of the present invention, a pulsed DC transmit waveform is created that allows both the rising and falling edges of the transmitted waveform to be converted into useful signal.

SUMMARY OF THE INVENTION

The present invention relates to a method of measuring position and orientation with improved signal to noise ratio. The present invention includes the following interrelated objects, aspects and features:

(1) In a first aspect, the present invention is intended to be used to measure position and orientation in six degrees of freedom, namely, location in the three coordinate directions commonly referred to as the X, Y and Z axes, and orientation coordinates commonly described as azimuth, elevation and roll. In the preferred embodiment, a pulsed DC transmit waveform is created that allows both the rising and falling edges of the transmitted waveform to be converted into signal usable in performing position and orientation measurements.

(2) In the preferred embodiment, a symmetrical transmitting waveform is employed that includes distinct non-overlapping axes. One example of such a waveform is a square wave that includes extremely steep rising and falling edges. Signal processing is preferably accomplished in a manner in which the integrator is reset at the start of the rising edge transient period and the coil output signal is integrated throughout the rising edge transient and steady state periods. The integration result is measured at the end of the steady state period just before the waveform begins to fall. The integrator is then reset and the coil output signal is integrated throughout the transmitter falling edge transient and off periods, and the integration result is measured at the end of the off period.

(3) By making the duration of the first integration equal to the duration of the second integration errors in integration output due to constant offset sources are equal and of equal sign. The output components due to the transmitted magnetic field however are equal and of opposite sign. Thus, by subtracting the second integration result from the first integration result, the offset components cancel and the signal components add. As a result, a 2:1 signal gain over prior art measuring techniques is accomplished while simultaneously automatically canceling integrator offset errors.

(4) A further advantage of the inventive technique is that dynamic errors caused by moving the sensor coil in the static Earth's field are reduced as the Nyquist sampling frequency is increased. When comparing the inventive method to the prior art, for equal eddy current settling steady state dwell times, the present invention achieves a 4:1 higher effective sampling rate. Thus, errors caused by motion of a sensor in the Earth's static field are reduced by a factor of 4 as compared to the prior art.

(5) The aliasing frequency for external interference sources is also increased by a factor of 4 and interference components below this frequency are also 4 times smaller than would be the case in prior art systems. Low frequency noise components caused by amplifiers and other circuit elements are also reduced in the same manner and to the same degree.

(6) The inventive method represents a strong departure from the prior art relating to position and orientation measuring systems in that it is capable of utilizing all of the available energy in the transmit waveform, thereby providing a 2:1 signal to noise gain over prior art pulsed DC systems which utilize the same time rate of change sensing means. The inventive method does not require compensation due to the presence of the Earth's magnetic field and also allows the critical integrator reset and sampling periods to be performed during the steady state portion of the transmitted waveform so that synchronization requirements are relaxed significantly. Post-processing computation is not required in order to remove integrator drift effects.

Accordingly, it is a first object of the present invention to provide a method of measuring position and orientation with improved signal to noise ratio.

It is a further object of the present invention to provide such a method having a significantly higher effective sampling rate over prior art systems.

It is a still further object of the present invention to provide such a method in which first and second integrations are conducted for equal time periods so that errors can be offset and thereby eliminated.

It is a still further object of the present invention to provide a method for quantitatively measuring the position and orientation of a sensor relative to a transmitter while avoiding compensation for the disadvantages of the static Earth's field.

It is a yet further object of the present invention to provide such a method in which all critical control operations are conducted during the steady state of the transmitted waveform, thereby eliminating the potential effects of time jitter and other system non-linearities.

It is a still further object of the present method to improve dynamic performance when the sensor is rotated in the static Earth's magnetic field.

It is a still further object of the present invention to provide such a method which improves low frequency noise immunity.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
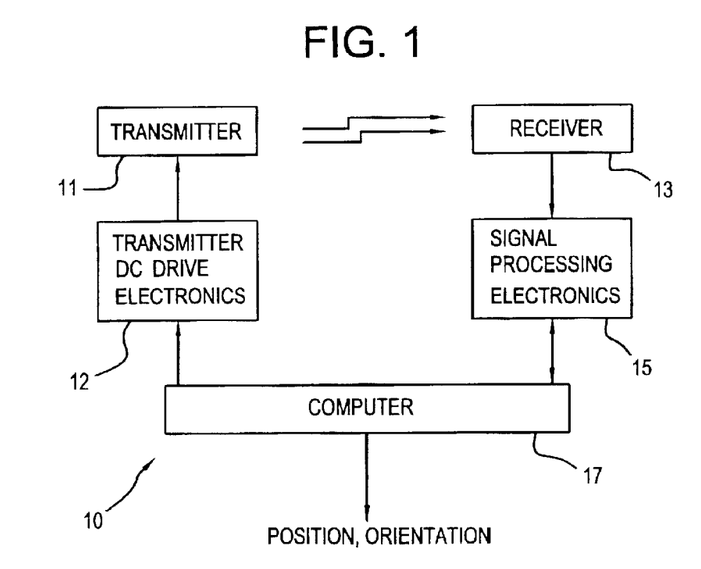
FIG. 1 shows a schematic representation of the circuitry of the present invention.

With reference, first, to FIG. 1, the schematic representation of the inventive system is generally designated by the reference numeral 10 and includes a transmitter 11 driven by transmitter DC drive electronics 12 to transmit signals received by the receiver 13 which conveys those signals to signal processing electronics generally designated by the reference numeral 15. A computer 17 controls the transmitter DC drive electronics 12 to operate the transmitter and receives data from the signal processing electronics 15 to permit determination of position and orientation of a sensor in six degrees of freedom.

The transmitter DC drive electronics 12 provide pulsed DC current signals of known amplitude to each transmitter axis. The computer 17 sets the current amplitude for each transmitting element. The transmitter 11 is located adjacent to a region where the receiver 13 is measuring position and orientation of an object. In the preferred embodiment, the transmitter 11 consists of a three axis magnetic field generation means in which the axes are mutually orthogonal. Of course, other set-ups can also be employed as desired with the computer 17 being pre-programmed to accommodate to the transmitter configuration.

The receiver 13 is also, preferably, a three axis receiver in which the receiver axes are mutually orthogonal. The receiver 13 is typically mounted either on an object that is being tracked or on one of several points of interest on the object in the case where the system is being employed in the environment of motion capture.

The receiver 13 detects magnetic fields produced by the transmitter 11 and the output of the receiver 13 is conveyed to the signal processing electronics 15. The electronics 15 control, condition and convert signals detected by the receiver 13 into a digital form suitable for further processing by the computer 17 which receives those signals and computes position and orientation.

Figure 4:
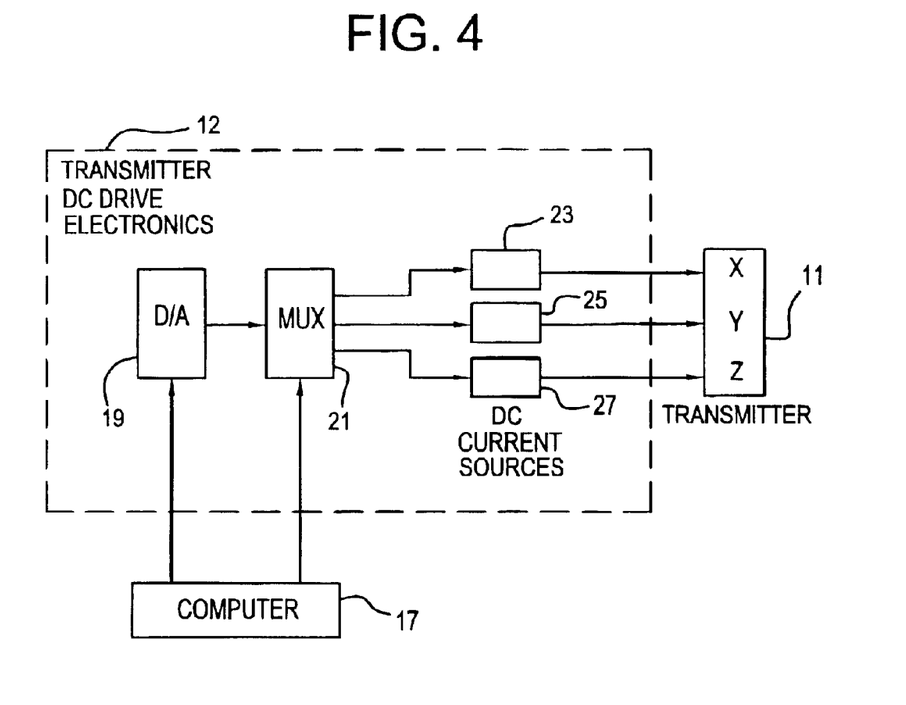
FIG. 4 shows a schematic representation of the transmitter DC drive electronics of the system used in conducting the inventive method.

With reference to FIG. 4, the transmitter DC drive electronics 12 include a digital-to-analog (D/A) converter 19 that converts the digital signals from the computer 17 into analog signals that are conveyed to the multiplexer 21 which sequentially activates the DC current sources 23, 25 and 27 which, upon command, produce the desired output waveform. The computer 17 instructs the multiplexer 21 as to which axis of the transmitter 11 to energize at any given time.

Figure 5:
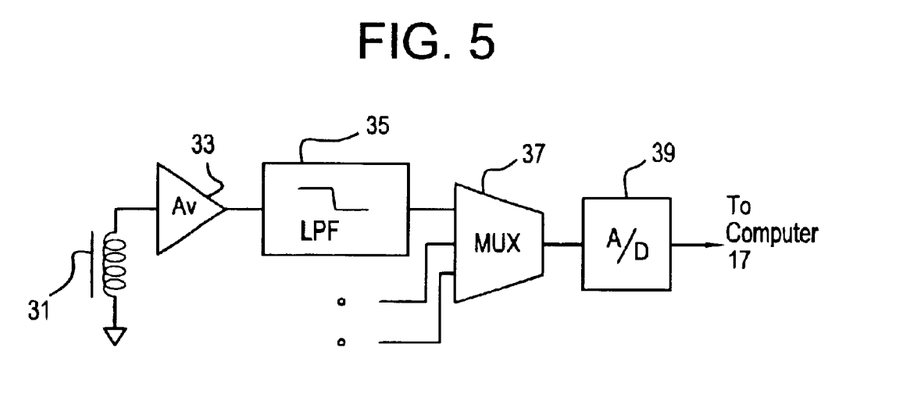
FIG. 5 shows a schematic representation of the receiver signal processing elements.

FIG. 5 shows one axis of the receiver 13, including a sensor coil 31 which sends signals received from the transmitter 11 to the amplifier 33 which amplifies those signals to make them more suitable for further processing. Low pass filter 35 band limits the amplified signal such that aliasing does not occur when the signals are sampled by the multiplexer 37 and digitized by the analog-to-digital (A/D) converter 39. The digitized signals are then sent to the computer 17 to be numerically integrated and processed to provide the position of the receiver 13.

In one example of specifications for a preferred embodiment of the present invention, the sampling rate of the A/D converter 39 is chosen to provide sufficient time resolution of the amplified signal. The digitizing rate may, for example, be fixed at 100 KHz and the multiplexer 37 may sample each of the three input signals provided thereto at 33.33 KHz.

Figure 2:
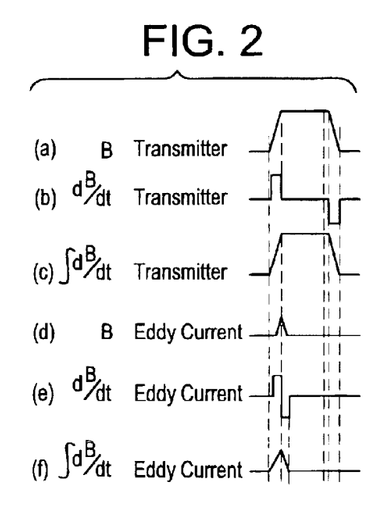
FIG. 2 shows a series of waveforms depicting different aspects of the operation of the invention disclosed in U.S. Pat. No. 5,453,686 to Anderson.

FIG. 2 shows different waveforms between the time G and time K corresponding to FIG. 4 of U.S. Pat. No. 5,453,686 to Anderson. Side-by-side with FIG. 2 is FIG. 3 showing corresponding waveforms in accordance with the teachings of the present invention.

Figure 3:
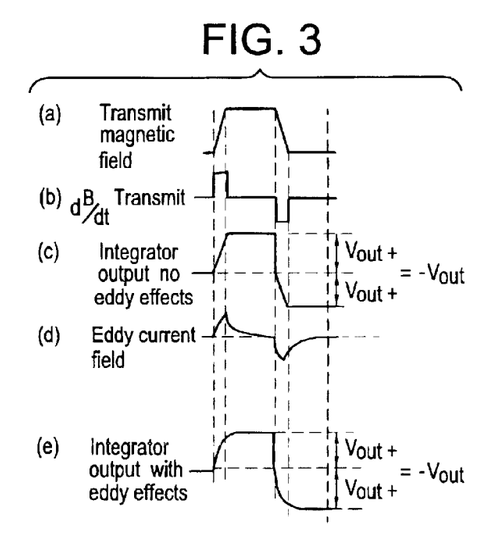
FIG. 3 shows the appearance of corresponding waveforms to those illustrated in FIG. 2 but for the present invention.

With reference to FIG. 3, different time intervals 1–5 are shown. It is important to note that the time period between the times 1 and 3 is equal to the time interval between the times 3 and 5. The significance of this fact will be described in greater detail hereinafter.

With reference to FIG. 3, the waveform labeled "(a)" shows the transmitted waveform. The graph labeled "(b)" shows the dB/dT of the transmitted waveform. The graph labeled "(c)" in FIG. 3 shows the integrator output devoid of eddy effects. At point 1 of waveform (c), the integrator is reset and the transmitter 11 is energized with a constant voltage source having the waveform described in graph (a). The transmitter 11 dB/dT occurs until the current regulation set point is reached at point 2. The integration output continues to accumulate until point 3 at which time the integrator total is sampled. The time between point 2 and point 3 is chosen such that the eddy current field depicted in the graph (b) has substantially decayed by point 3 as shown, the exact time depending upon the particular environment, with 1.5 mS being a typical initial value. At this time, the output of the integrator depicted in graph (c) represents the magnetic field value at the sensor coil 31. At point 3, immediately after sampling, the integrator is reset to zero. At this time, the transmit magnetic field shown in graph (a) is ramped down until it equals zero at time 4.

The integrator continues to integrate until time 5, at which time it is sampled and a new cycle begins. The time between the interval 1–3 and the interval 3–5 is selected to be precisely equal so that offset drift components caused by integrator drift are equal to one another. The second integration is subtracted from the first so that the offset contributions are automatically canceled while the signal components are automatically added, whereupon the signal components can be divided by two to arrive at the net signal component.

Figure 6:
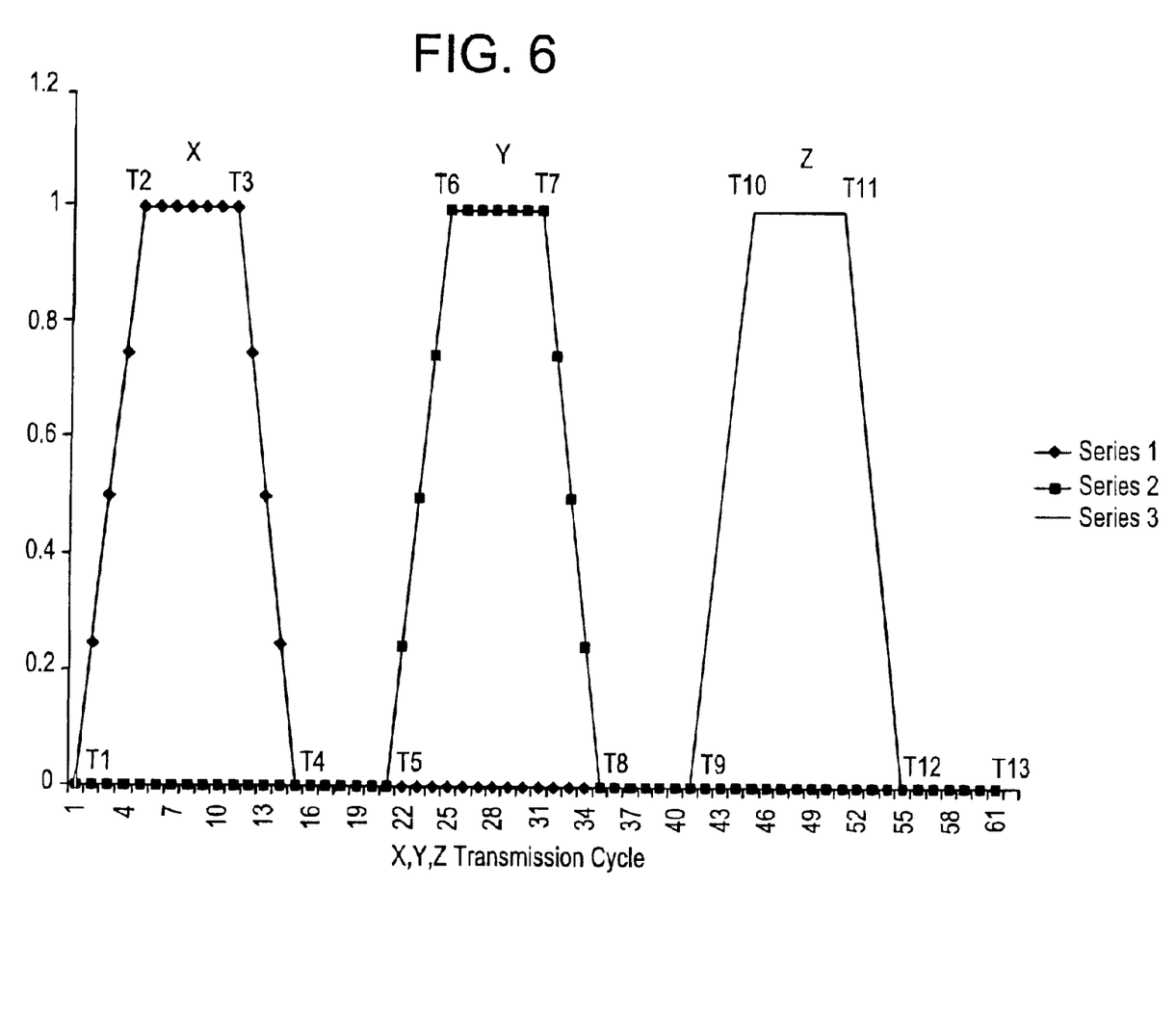
FIG. 6 shows a schematic representation of the transmitter waveform showing one X, Y and Z transmission cycle.

FIG. 6 shows a transmission cycle for the X, Y and Z waveforms which are seen to be square waves having extremely steep rising and falling edges.

Figure 7:
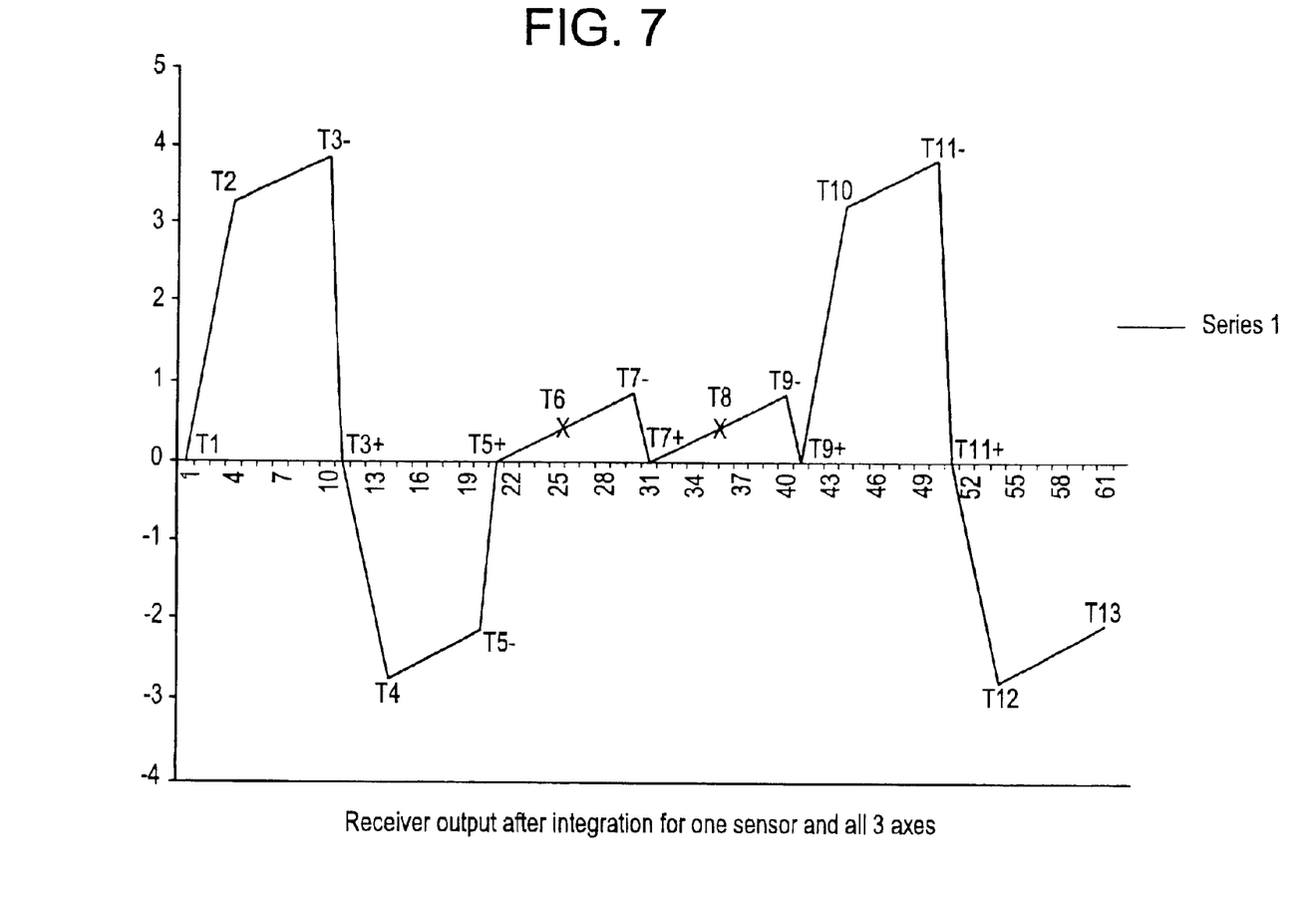
FIG. 7 shows a schematic representation of the receiver output after integration for one sensor axis and all three transmitter axes.

FIG. 7 shows the receiver output after integration for one sensor axis and for all three transmit axes.

At T1, the X axis of transmitter 11 is energized and the integration accumulator is set to zero. At T2, the magnetic field has reached a steady state value, which continues until T3–. The integrator integrates the output from sensor coil 31 plus a fixed constant offset, which is generally due to imperfections in amplifier 33. This causes the integrator value to change from T2 to T3– in proportion to the fixed offset value. At T3–, the integrator value is read into the computer 17. At T3+, the integrator is reset to zero and then the X axis of transmitter 11 is ramped down until reaching zero value at T4. The integrator integrates until T5–, at which time it represents the negative of the value of the sensor B field before the X axis of transmitter 11 was de-energized, plus the same fixed constant offset as was present previously. At T5–, the integrator value is sampled and sent to computer 17, where it is subtracted from the value obtained at T3–, yielding an offset free value representing two times the field present at sensor coil 31.

For clarity, in this example, receiver 13 was positioned such that the Y axis of transmitter 11 was at right angles to sensor coil 31, resulting in zero signal in sensor coil 31 due to the Y axis. At T5+, the Y axis of transmitter 11 is energized and the integration accumulator is set to zero. At T6, the magnetic field has reached a steady state value, which continues until T7−. The integrator integrates the output from sensor coil 31 plus a fixed constant offset, which is generally due to imperfections in amplifier 33. This causes the integrator value to change from T6 to T7− in proportion to the fixed offset value. At T7−, the integrator value is read into computer 17. At T7+, the integrator is reset to zero and then the Y axis of transmitter 11 is ramped down until reaching zero value at T8. The integrator integrates until T9−, at which time it represents the negative of the value of the sensor B field before the Y axis of transmitter 11 was de-energized, plus the same fixed constant offset as was present previously. At T9−, the integrator value is sampled and sent to the computer 17, where it is subtracted from the value obtained at T7−, yielding an offset free value representing two times the field present at sensor coil 31. In this particular example, since there was a zero signal value, the values at the integrator outputs represent only fixed parasitic offsets. It is seen that when the second integration is subtracted from the first, the result is zero.

At T9+, the Z axis of transmitter 11 is energized and the integration accumulator is set to zero. At T10, the magnetic field has reached a steady state value, which continues until T11−. The integrator integrates the output from sensor coil 31 plus a fixed constant offset, which is generally due to imperfections in amplifier 33. This causes the integrator value to change from T10 to T11− in proportion to the fixed offset value. At T11−, the integrator value is read into the computer 17. At T11+, the integrator is reset to zero and then the Z axis of transmitter 11 is ramped down until reaching zero value at T12. The integrator integrates until T12−, at which time it represents the negative of the value of the sensor B field before the Z axis of transmitter 11 was de-energized, plus the same fixed constant offset as was present previously. At T13, the integrator value is sampled and sent to computer 17, where it is subtracted from the value obtained at T11−, yielding an offset free value representing two times the field present at sensor coil 31.

It should be noted that causing transmitter 11 to operate in a bipolar mode where the values between T5–T6, T8–T9, and T12–T13 are of the same magnitude and opposite sign of that produced between T2–T3, T6–T7, and T10–T11, respectively, does not alter the fundamental method of operation.

Figure 8:
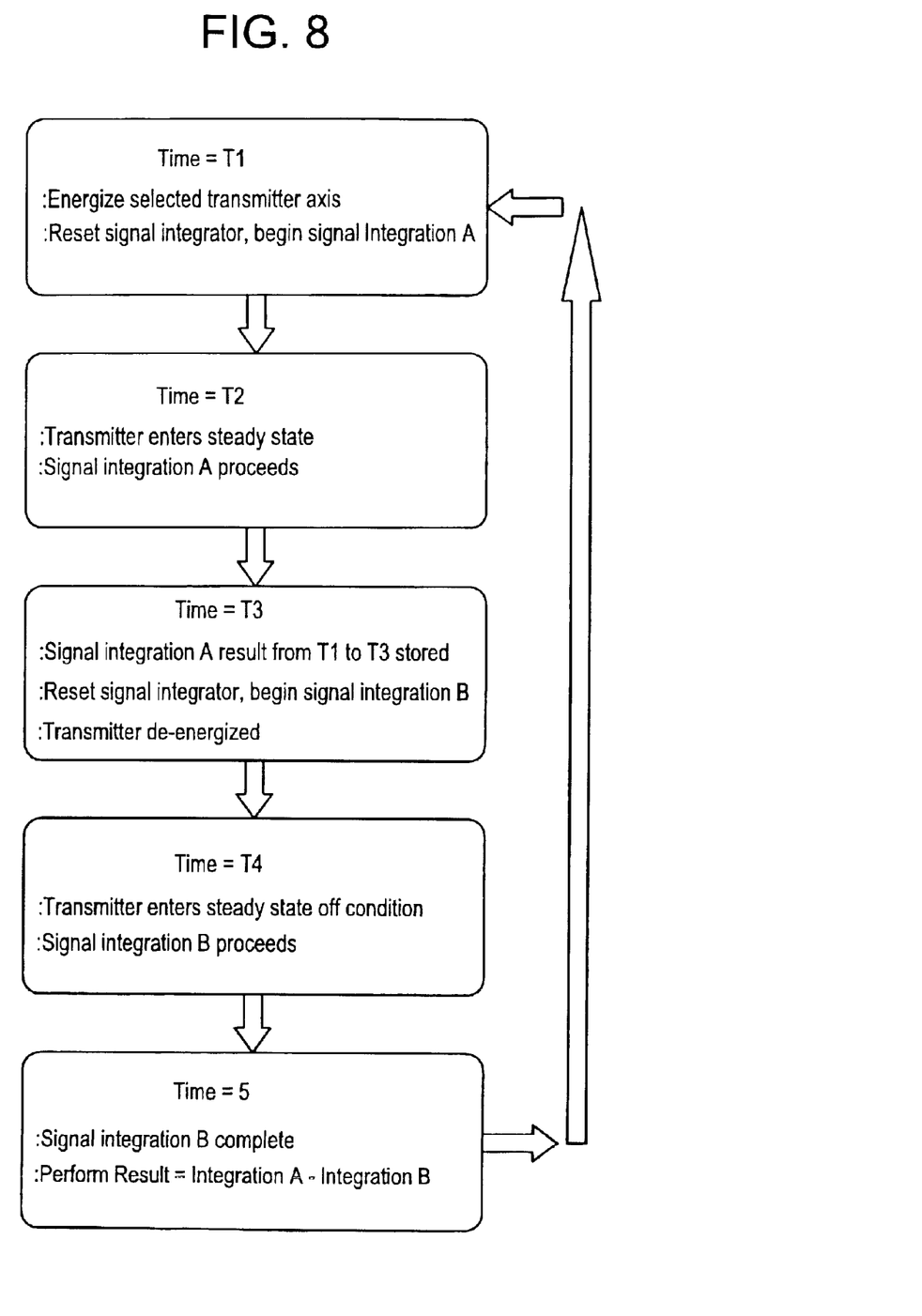
FIG. 8 shows a flowchart of operation of significant aspects of the inventive method.

Reference is now made to FIG. 8 which should be reviewed in conjunction with the time intervals as numbered and depicted in FIG. 3. The sequence depicted in FIG. 8 is repeated for each axis of the transmitter.

As such, an invention has been disclosed in terms of a preferred embodiment that fulfills each and every one of the objects of the invention as set forth hereinabove, and provides a new and useful method of measuring position and orientation with improved signal to noise ratio of great novelty and utility.

Of course, various changes, modifications and alterations in the teachings of the present invention may be contemplated by those skilled in the art without departing from the intended spirit and scope thereof.

As such, it is intended that the present invention only be of the appended claims.

What is claimed is:

1. A method of measuring position and orientation of an object in a prescribed three-dimensional space, including the steps of:
    a) providing a multi-axis transmitter located adjacent said space;
    b) providing a multi-axis receiver attached to said object;
    c) providing driver means for driving each transmitter axis to emit a square DC-based waveform into said space upon command from a computer having an integrator;
    d) driving said transmitter such that a waveform emitted into said space by one axis thereof does not overlap with a waveform emitted by another axis thereof into said space;
    e) providing each waveform with the following configurations:
        i) beginning a rising edge at time T1;
        ii) beginning a steady state at maximum amplitude at time T2;
        iii) beginning a falling edge at time T3;
        iv) beginning a steady state at minimum amplitude at time T4; and
        v) beginning a next rising edge at time T5;
        vi) wherein a time period T1 to T3 equals a time period T3 to T5;
    f) activating a first axis of said transmitter to emit a waveform into said space;
    g) receiving signals at said receiver and conveying said signals to said computer;
    h) integrating said signals using said integrator from time T1 to T3 to obtain integration A;
    i) integrating said signals using said integrator from time T3 to T5 to obtain integration B;
    j) subtracting integration B from integration A to obtain final result C;
    k) repeating steps f)–j) for each axis of said transmitter.

2. The method of claim 1, wherein said transmitter comprises a three axis transmitter.

3. The method of claim 1, wherein said conveying step includes the step of converting said signals to digital signals.

4. The method of claim 1, before said first-mentioned integrating step, further including the step of resetting said integrator.

5. The method of claim 1, after said first-mentioned integrating step, further including the step of resetting said integrator.

6. The method of claim 2, wherein said transmitter axes are mutually orthogonal.

7. The method of claim 2, wherein said receiver comprises a three axis receiver.

8. The method of claim 3, before said converting step, further including the step of amplifying said signals.

9. The method of claim 4, after said first-mentioned integrating step, further including the step of resetting said integrator.

10. The method of claim 7, wherein said receiver axes are mutually orthogonal.

11. The method of claim 7, wherein said final result C is in six degrees of freedom.

12. The method of claim 11, wherein said six degrees of freedom comprise X, Y, Z coordinates as well as azimuth, elevation and roll.

13. A method of measuring position and orientation of an object in a prescribed three-dimensional space, including the steps of:
    a) providing a three axis transmitter located adjacent said space;

b) providing a three axis receiver attached to said object;

c) providing driver means for driving each transmitter axis to emit a square DC-based waveform into said space upon command from a computer having an integrator;

d) driving said transmitter such that a waveform emitted into said space by one axis thereof does not overlap with a waveform emitted by another axis thereof into said space;

e) providing each waveform with the following configurations:
   i) beginning a rising edge at time T1;
   ii) beginning a steady state at maximum amplitude at time T2;
   iii) beginning a falling edge at time T3;
   iv) beginning a steady state at minimum amplitude at time T4; and
   v) beginning a next rising edge at time T5;
   vi) wherein a time period T1 to T3 equals a time period T3 to T5;

f) activating a first axis of said transmitter to emit a waveform into said space;

g) receiving signals at said receiver and conveying said signals to said computer;

h) resetting said integrators and integrating said signals using said integrator from time T1 to T3 to obtain integration A;

i) resetting said integrator and integrating said signals using said integrator from time T3 to T5 to obtain integration B;

j) subtracting integration B from integration A to obtain final result C;

k) repeating steps f)–j) for each axis of said transmitter.

14. The method of claim 13, wherein said transmitter axes are mutually orthogonal.

15. The method of claim 13, wherein said conveying step includes the step of converting said signals to digital signals.

16. The method of claim 14, wherein said receiver axes are mutually orthogonal.

17. The method of claim 15, before said converting step, further including the step of amplifying said signals.

18. The method of claim 16, wherein said final result C is in six degrees of freedom.

19. The method of claim 18, wherein said six degrees of freedom comprise X, Y, Z coordinates as well as azimuth, elevation and roll.

* * * * *